United States Patent [19]
Horikoshi et al.

[11] 3,844,890
[45] Oct. 29, 1974

[54] ALKALINE CELLULASE AND PREPARATION OF THE SAME

[75] Inventors: Koki Horikoshi, Iruma; Yonosuke Ikeda; Masami Nakao, both of Tokyo, all of Japan

[73] Assignee: Rikagaku Kenkyusho, Wako-shi, Saitama-ken, Japan

[22] Filed: Sept. 27, 1972

[21] Appl. No.: 292,496

[30] Foreign Application Priority Data
Sept. 30, 1971 Japan.............................. 46-76685

[52] U.S. Cl..................... 195/62, 195/33, 195/66 R
[51] Int. Cl............................................. C07g 7/02
[58] Field of Search .......... 195/66 R, 33, 62, 65, 64

[56] References Cited
OTHER PUBLICATIONS

Peterson et al., Arch Bioch. and Biophy. 124, pgs. 497–503 (1968).
Chem. Abstracts, 67:61753c (1967).

*Primary Examiner*—A. Louis Monacell
*Assistant Examiner*—Thomas G. Wiseman

[57] ABSTRACT

A novel alkaline cellulase characterized by being an enzyme having an optimal pH of about from 8 to 10 at a temperature of 40° C and a method for preparing thereof characterized by fermentation of a strain of microorganism selected from the group consisting of Bacillus $N_1$ and Bacillus $N_4$ in an alkaline culture medium containing a carbonate.

6 Claims, 8 Drawing Figures

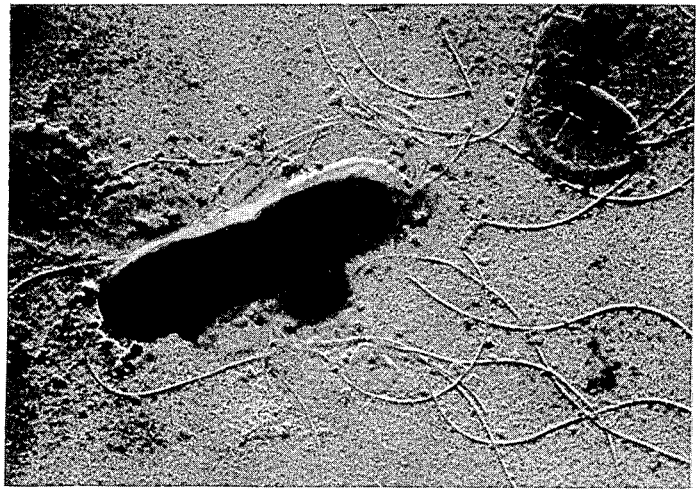
BACILLUS N₁ STRAIN
F I G. 1
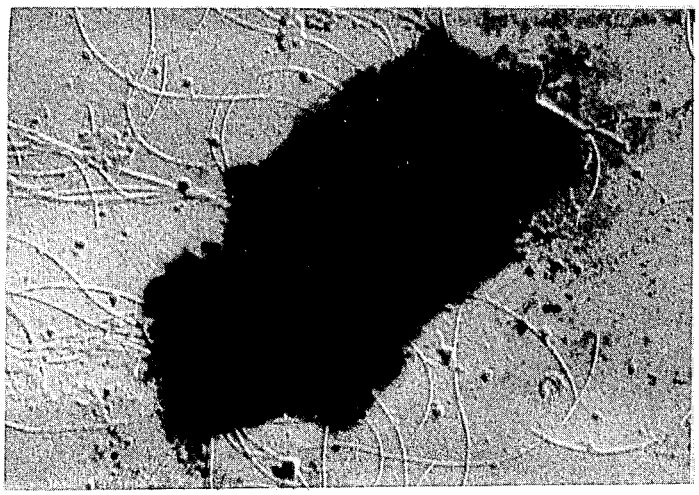
BACILLUS N₄ STRAIN
F I G. 2

ALKALINE CELLULASE AND PREPARATION OF THE SAME

This invention relates to a novel alkaline cellulase and an advantageous manufacture of the same by cultivation of a novel microorganism producing alkaline cellulase in an alkaline culture medium containing a carbonate.

The existence of cellulases has heretofore been confirmed in certain kinds of fungi, bacteria, mollusks and higher animals. Regarding the characteristics, cellulases originating from animals and fungi, have optimum pH of from 5.0 to 6.0, and cellulases originating from bacteria belonging to the genus Pseudomonas or the like have optimum pH approximately 7.0. It is also known that the heat resistance of such cellulases is such that when they are treated at 60° – 70° C for 10 minutes, the activity would be lost, and further their activity is generally hindered by heavy metals.

The primary object of the present invention is to provide novel alkaline celluloses characterized in that the optimum pH thereof is from 8.0 to 10.0, and the activity can be still retained after treatment at 70° C for 10 minutes and also not hindered by heavy metals.

These objects can be accomplished by a process according to the present invention which comprises cultivating a novel alkaline cellulase producing bacteria belonging to the genus Bacillus in a suitable medium and recovering the produced novel alkaline cellulases from the culture broth.

The present invention will be explained referring the attached drawings:

FIGS. 1 and 2 are electron-microscopic photographs of microorganisms to be used in this invention, Bacillus $N_1$ strain, and Bacillus $N_4$ strain;

Figure 3:
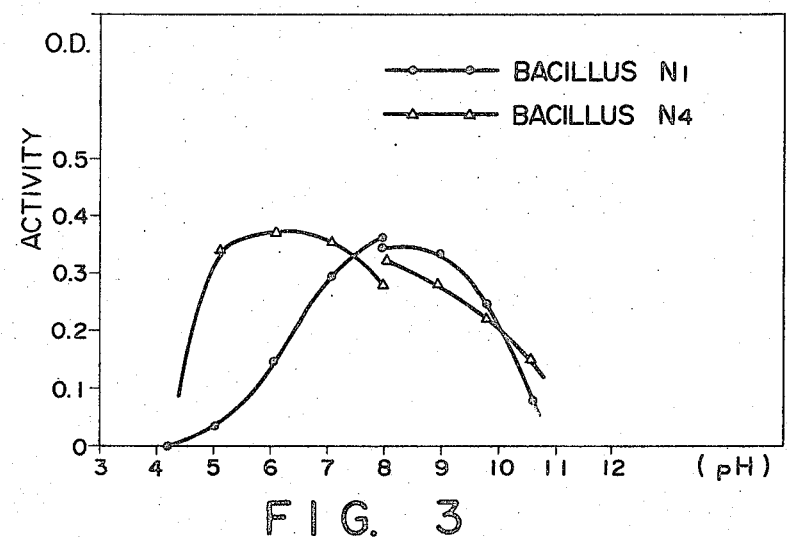
FIG. 3 is a graph illustrating activities of the alkaline cellulases obtained according to this invention.

The microorganisms to be used in the present invention are novel species belonging to the genus Bacillus, which grow well in a culture medium described hereinbelow and produce an alkaline cellulase. These species were for the first time discovered and separated from soils of Hirosawa, Wako-shi, Saitama-prefecture, Japan and named by us Bacillus $N_1$ and Bacillus $N_4$ strains.

Each isolation of the said microorganisms, Bacillus $N_1$ and Bacillus $N_4$ was carried out by a procedure described in below.

The soil was suspended in sterilized water and plated on the following medium:

(Medium composition)
a) Soluble starch           20 g
   $K_2HPO_4$                1 g
   Yeast extract             5 g
   Peptone                  10 g
   $MgSO_4·7H_2O$          0.2 g
   Agar                     20 g
   Water                   900 ml b) $Na_2CO_3$               10 g
   Water                   100 ml (After sterilized at 115°C for 15 min., a) and b) were mixed.)

The plate was incubated at 37° C for 24 to 48 hours.

Thus, a colony of a microorganism which produced the said alkaline cellulase was isolated from colonies on the plate.

This microorganism was called "Bacillus $N_1$." The said Bacillus $N_4$ was also isolated by the same method.

The strains identified as said Bacillus $N_1$ and Bacillus $N_4$ have been deposited with the American Type Culture Collection (ATCC) as ATCC access numbers 21832 and 21833 respectively, and are on deposit with ATCC in unrestricted deposit permitting the public full access to the culture. The said strains have been released for distribution to the public on Sept. 13, 1970. The present inventors found the fact that the said microorganisms, Bacillus $N_1$ and Bacillus $N_4$ produce and accumulate novel alkaline cellulases under the culture conditions to be described in later, and succeeded in establishing the process for the manufacture of the alkaline cellulase of the present invention.

The said Bacillus $N_1$ and Bacillus $N_4$ have the following properties: The microbiological properties were tested by the methods described in "Aerobic Spore-forming Bacteria" by Nathan R. Smith, R. E. Gordon and F. E. Clark (United States Department of Agriculture, November 1952) and "Bergey's Manual of Determinative Bacteriology" (1957).

Unless otherwise specifically indicated, media which have compositions indicated below were used, the pH value of each medium being adjusted to about 10 by addition of 1.0 percent of anhydrous sodium carbonate. [Each value in Table indicates the weight (gram) in 1 liter of water.]

| Composition Medium | Sodium carbonate | Peptone | Meat extract | Yeast extract | Glucose | Starch | Others |
|---|---|---|---|---|---|---|---|
| separatory medium | 10 | 5 | | 5 | | 20 | $K_2HPO_4$(1), agar (15) $MgSO_4·7H_2O$(0.2) |
| Bouillon | 10 or not added | 5 | 3 | | | | |
| Bouillon-agar | do. | do. | do. | | | | agar (15) |
| NaCl-Bouillon | do. | do. | do. | | | | NaCl (70) |
| Glucose-bouillon | do. | do. | do. | | 10 | | |
| Glucose-bouillon-agar | do. | do. | do. | | do. | | agar (15) |
| gelatin medium | do. | do. | do. | | | | gelatin (5) |
| peptone water | do. | do. | | | | | |

Continued

| Composition Medium | Sodium carbonate | Peptone | Meat extract | Yeast extract | Glucose | Starch | Others |
|---|---|---|---|---|---|---|---|
| potato medium | do. | | | | | | commercially available potato extract (Difco) (50) agar (15) |
| medium for determining growth conditions | 10 | 5 | | 5 | 20 | | $K_2HPO_4$ (1) agar (15) $MgSO_4 \cdot 7H_2O$ (0.2) |
| medium for V.P. test | 10 | 7 | | | 5 | | NaCl (5) |
| medium for nitrate reduction test | 10 | 5 | 3 | | | | $KNO_3$ (1) |
| medium for starch hydrolysis test | 10 | 5 | | 5 | | 20 | $K_2HPO_4$ (1) agar (15) $MgSO_4 \cdot 7H_2O$ (0.2) |
| medium for citric acid utilization test | 10 or not added | | | | | | NaCl (1) $MgSO_4 \cdot 7H_2O$ (0.2) $(NH_4)_2HPO_4$ (1) $KH_2PO_4$ (0.5) sodium citrate (2) agar (15) |
| medium for anaerobic growth test | 10 | 10 | 3 | 2 | 10 | | $K_2HPO_4$ (5) |
| medium for sugar utilization test | 10 | | | | | | $(NH_4)_2HPO_4$ (1) KCl (0.2) $MgSO_4$ (0.2) yeast extract (0.2) Sugars (5) |
| medium for casein decomposition test | 10 | | | 5 | 10 | | casein (5) $K_2HPO_4$ (1) agar (15) $MgSO_4 \cdot 7H_2O$ (0.2) |
| medium for catalase reaction test | | | | | | | $K_2HPO_4$ (1) agar (15) $MgSO_4 \cdot 7H_2O$ (0.2) |

Morphological observation of $N_1$ strain and $N_4$ strain was effected on the growth on the above-mentioned separatory medium.

1. Microbiological Properties of $N_1$ Strain a. Morphology:

The size of microorganism is $(0.5 - 0.8\mu) \times (1.5 - 2.0\mu)$ and the spore is oval of a size of $(0.8 - 1.2\mu) \times (1.8 - 2.2\mu)$. The sporangium is swollen. As seen from an electro-microscopic photograph of FIG. 1, the microorganism has peritrichous flagella with motility.

b. Cultural Characteristics on Various Media:

| Medium | Growth State at pH 7 | at pH 10 |
|---|---|---|
| i) Bouillon | no growth | good growth |
| ii) Bouillon-agar | no growth | good growth |
| iii) glucose-bouillon | no growth | very good growth |
| iv) glucose-bouillon-agar | no growth | very good growth |
| v) gelatin medium | no growth | good growth |
| vi) peptone water | no growth | growth |
| vii) potato medium | no growth | good growth |

The growth of the strain was observed on a medium comprising 0.5 percent of peptone, 0.5 percent of yeast extract, 1.0 percent of glucose, 0.01 percent of $K_2HPO_4$, 0.002 percent of $MgSO_4$, 1.0 percent of $Na_2CO_3$ and 1.5 percent of agar (pH = 10.0) (of these ingredients, $Na_2CO_3$ was added after it had been sterilized separately).

i. The plate Culture:

The colony has a circular configuration and has a flat surface. The periphery of the colony is undulate or auriculate. The colony exhibits a yellowish brown color with luster.

ii. Slant Culture:

Spreading and lustrous.

iii. Stab Culture:

The growth is observed only on the surface, but not in the deep portion.

c. Biological Properties:

i. Optimum growing conditions:

pH 9.0 - 10.0
    Temperature 30 - 42°C
    Aerobic ii. Growth conditions:

| | |
|---|---|
| pH | 8.0 – 11.0 |
| Temperature | no growth at 45°C (alkaline medium) |
| Aerobic | | iii. Gram dying test: positive (in the above-mentioned separatory medium)
iv. Voges-Proskauer (V.P.) reaction: positive
v. Nitrate reduction: positive
vi. Catalase reaction: positive
vii. Liquefaction of gelatin: very weak
viii. Hydrolysis of starch: positive
ix. Citric acid-agar medium (alkaline): very bad growth
x. Under anaerobic conditions: no growth
xi. 7 percent Saline bouillon:

good growth under alkaline
   conditions (formation of pre-
   cipitates) but no growth under
   neutral conditions.

xii. Formation of spores on bouillon-agar medium: Spores are hardly formed and, even if they grow, the growth rate is extremely low.
xiii. Decomposition of casein: very weak d. Utilization of Carbon Sources:

$N_1$ strain does not grow under neutral conditions, and under alkaline conditions it grows but the acid production cannot be determined because the medium comprises 1.0 percent of the carbonate. Under alkaline conditions, the strain does not utilize galactose, raffinose, sorbitol or glycerin.

2. Microbiological Properties of $N_4$ strain a. Morphology:

The size of the microorganism is $(0.1 – 0.2\mu) \times (4.0 – 6.0\mu)$ and spores is circular of a size of $(1.5 – 2.0\mu) \times (1.5 – 2.0\mu)$. Sporocyst is swollen. As seen from an electron-microscopic photograph of FIG. 2, the growth has peritrichous flagella with motility.

b. Cultural Characteristics on Various Media:

| Medium | Growth State | |
|---|---|---|
| | pH 7 | pH 10 |
| i) bouillon | no growth | no growth |
| ii) bouillon-agar | no growth | no growth |
| iii) glucose-bouillon | no growth | very good growth |
| iv) glucose-bouillon-agar | no growth | very good growth |
| v) gelatin | no growth | no growth |
| vi) peptone water | no growth | no growth |
| vii) potate | no growth | good growth |

The growth were observed when $N_4$ strain was cultured on a medium comprising 0.5 percent of peptone, 0.5 percent of yeast extract, 1.0 percent of glucose, 0.01 percent of $K_2HPO_4$, 0.002 percent of $MgSO_4$, 1.0 percent of $Na_2CO_3$ and 1.5 percent of agar (pH = 10.0) (of these ingredients, $Na_2CO_3$ was added after it had been sterilized separately).

i. Plate Culture:
The form of the colony is irregular, and the surface of the colony is flat. The periphery of the colony is undulate or auriculate. The colony exhibits a grayish white color with luster.

ii. Slant Culture:
Spreading and lustrous.

iii. Stab Culture:
The growth is observed only on the surface, but not in the deep portion.

c. Biological Properties:

i. Optimum conditions for growth:

| | |
|---|---|
| pH | 9.0 – 10.0 |
| Temperature | 30 – 42°C |
| Aerobic | | ii. Growth conditions:

| | |
|---|---|
| pH | 8.0 – 11.0 |
| Temperature | no growth at 45°C |
| Aerobic | | iii. Gram dying test: positive (in the above-mentioned separatory medium)
iv. Voges-Proskauer (V.P.) reaction: positive
v. Nitrate reduction: positive
vi. Catalase reaction: positive
vii. Liquefaction of gelatin: very weak
viii. Hydrolysis of starch: positive
ix. Citric acid-agar medium (alkaline): very bad growth
x. Under anaerobic conditions: no growth
xi. 7 percent Saline bouillon:

good growth under alkaline
   conditions (occurrence of
   turbidness) but no growth
   under neutral conditions vii. Formation of spores on bouillon-agar medium: Formation of spores is hardly observed.
viii. Decomposition of casein: very weak d. Utilization of Carbon Sources:

$N_4$ strain does not grow under neutral conditions, and under alkaline conditions it grows but the acid production cannot be determined because the medium comprises 1.0 percent of the carbonate. Under alkaline conditions it does not utilize inositol, sorbitol or glycerin.

These microbiological properties of $N_1$ strain and $N_4$ strain are summarized in the following Table, from which it will readily be understood that these strains have different microbiological properties and they belong to different species.

| Property | $N_1$ strain | $N_4$ strain |
|---|---|---|
| I | $(0.5–0.8\mu) \times (1.5–2.0\mu)$ | $(0.1–0.2\mu) \times (4.0–6.0\mu)$ |
| II | $(0.8–1.2\mu) \times (1.8–2.2\mu)$ | $(1.5–2.0\mu) \times (1.5–2.0\mu)$ |
| III | circular, flat, yellowish brown with luster | opaque, flat, grayish white with luster |
| IV | expanded cloth-like form, lustrous | expanded cloth-like form, lustrous |
| V | growth | no growth |
| VI | hydrolyzing | hydrolyzing |
| VII | very weak | very weak |
| VIII | very weak | very weak |
| IX | formation of precipitates | occurrence of turbidness |
| X | not utilizing gelactose, raffinose, sorbitol or glycerin | not utilizing inositol, sorbitol or glycerin |

I : bacteria size
II : spore size
III : state at plate culture
IV : state at slant culture
V : growth on bouillon-agar medium
VI : hydrolysis of starch
VII : liquefaction of gelatin
VIII: hydrolysis of casein
IX : growth state on 7% saline bouillon
X : upper limit of growth observable temperature Based on these properties, $N_1$ strain and $N_4$ strain were examined according to the classification methods disclosed in the above quoted literature references, i.e., N. R. Smith et al., "Aerobic Spore-forming Bacteria" and "Bergey's Manual of Determinative Bacteriology (1957)" (page 613 onward). As a result, it was found that each strain is similar in some points to known bacteria belonging to the genus Bacillus but each of $N_1$ strain and $N_4$ strain is quite different from these known bacteria with respect to characteristic properties. Thus, since any strain concurring with either of $N_1$ and $N_4$ strains with respect to microbiological properties could not be found among known bacteria, we deemed it reasonable to identify them as new species belonging to the genus Bacillus.

More specifically, since each of $N_1$ strain and $N_4$ strain is an aerobic spore-forming bacteria, it is apparent that each belongs to the genus Bacillus. As the characteristic properties of these stains there may be mentioned a property that each of $N_1$ strain and $N_4$ strain grows only in an alkaline medium but does not grow in a neutral medium.

As a result of study for known strains made for determination of $N_1$ strain and $N_4$ strain, it has been found reasonable that strain $N_1$ is similar to *Bacillus polymyxa* and *Bacillus alvei* and strain $N_4$ to *Bacillus pasteurii*. However, although $N_1$ strain grows in a 7 percent saline medium, either *Bacillus polymyxa* or *Bacillus alvei* does not grow in a 5 percent saline medium. $N_4$ strain hydrolyzes starch and is positive to Voges-Proskauer (V.P.) reaction, whereas *Bacillus pasteurii* does not hydrolyze starch and is negative to Voges-Proskauer (V.P.) reaction. More characteristic difference resides in the growth pH. In general, bacteria belonging to the genus Bacillus grow under pH condition of about 5.0 to 8.0, *Bacillus polymyxa* grows at a pH value of 4.8 – 7.2, *Bacillus alvei* grows at a pH value of 4.8 – 5.6, and *Bacillus pasteurii* grows at a pH value of up to 8.6 under anaerobic conditions. In contrast, $N_1$ strain and $N_4$ strain grow at a pH ranging from about 8.0 to 11.0. Therefore, in view of above $N_1$ strain and $N_4$ strain can clearly be distinguished from the above-mentioned known analogous species.

As described above, any species concurring with $N_1$ strain or $N_4$ strain cannot be found among known species, and in view of characteristic microbiological properties it is reasonable to identify them as new species.

Thus, we have named $N_1$ strain and $N_4$ strain "Bacillus $N_1$ strain" and "Bacillus $N_4$ strain," respectively.

Each of $N_1$ strain and $N_4$ strain produces and accumulates an alkaline cellulase of high units in a culture broth. In culturing of these strains, it is preferred to use, as carbon sources, various sugar materials such as glucose, saccharose, starch, CMC, bran, cellulose powder, etc. and as nitrogen sources, peptone, meat extract, cornsteep liquor, defatted soybean, etc. It is also possible to employ inorganic substances such as ammonium salts, phosphates and nitrates.

Further, better results are obtained by incorporation of minute amounts of inorganic metal salts, vitamins, growth-promoting factors such as yeast extract, etc. In order to maintain the pH value of a culture broth at a level approximately 10, it is desirable to add 0.5 – 1.5 percent of anhydrous sodium carbonate.

It is also preferred to conduct the culturing at a temperature of about 20° to about 40° C under shaking or air-bubbling agitation. The production of the intended alkaline cellulase reaches the maximum during about 2 to about 6 days. A crude enzyme liquor may be obtained by subjecting the culture broth to the centrifugal separation, the filtration with use of a filtering aid or by coprecipitating fungous body with a salt such as calcium acetate.

The so recovered crude enzyme liquor may be used as it is, but it is possible to recover a refined enzyme by subjecting the crude enzyme liquor to a known isolation method such as salting-out with ammonium sulfate, solvent precipitation or dialysis to obtain crude solid enzyme and then purifying and crystallyzing the resulting crude enzyme.

Figure 4:
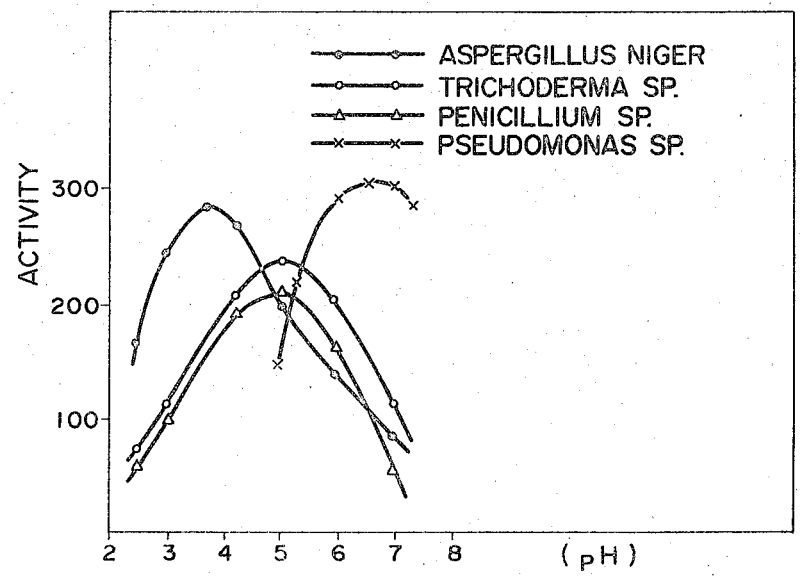
FIG. 4 is a graph illustrating activities of known cellulases.

Both alkaline cellulase standard substances obtained from the culture broth of $N_1$ strain and $N_4$ strain have an optimum pH for activity ranging from about 8 to about 10 as shown in FIG. 3. This activity is characteristic of these alkaline cellulases, because activities of known cellulases originating microorganisms (*Asp. niger*, *Trichoderma sp.*, *Penicillium sp.*, and *Pseudomonas sp.*), has the optimum pH in the range of about 4 to about 7, as shown in FIG. 4.

The activity of the standard substances of the alkaline cellulase obtained according to this invention is determined in the following manner.

Activity Determination Method and Activity Unit 0.5 ml of an enzyme liquor is added to 1 ml of CMC (2.0 percent) and 1 ml of glycine NaCl-NaOH buffer solution (pH = 9.0), and the reaction is effected at 40° C for 20 minutes.

After completion of the reaction, the determination of reduced sugar is conducted by 3,5-dinitro-salicylic acid (DNS) method. More specifically, 1 ml of DNS reagent is added into 0.25 ml of the reaction liquor, and the mixture is heated at 100° C for 5 minutes to effect coloration. After cooling, the liquor is diluted with 4 ml of distilled water. Then, absorbance is measured at 500 m$\mu$.

The unit of activity of the enzyme is determined on the following scale. Namely, when reduced sugar in an amount corresponding to 1 mg of glucose is formed for 1 minute under the above conditions, the activity is defined to be 100 units.

The alkaline cellulases according to the present invention exhibits a relative activity of 200 to 1,000 units/g, and are proved to be novel enzymes having novel physical and chemical properties which will be detailed below.

Physical and Chemical Properties of Enzyme

1. Function and Substrate Characteristic:

The alkali cellulases obtained by culturing $N_1$ strain and $N_4$ strain act specifically on the following celluloses and decompose them.

| | Microorganism |  |
|---|---|---|
| Microorganism used for production of the alkali cellulase | $N_1$ strain | $N_4$ strain |
| Substrates to be decomposed | CMC cellulose | CMC cellulose |

2. Optimum pH:

pH values were controlled by use of McIlvaine's buffer solution and glycine buffer solution to pH values of 3 – 8 and 8 – 11 respectively.

Figure 5:
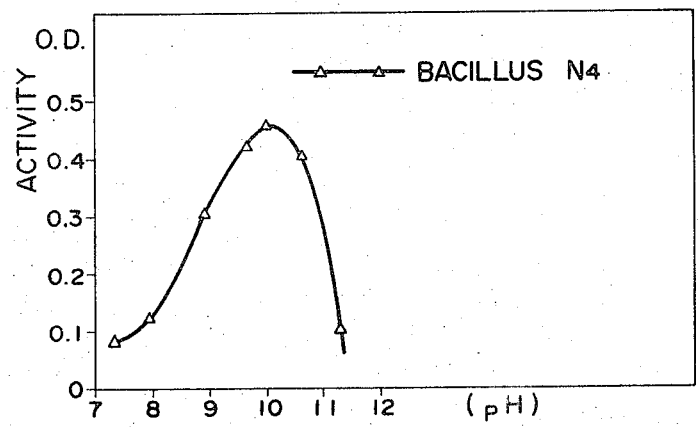
FIG. 5 is a graph illustrating activities of the alkaline cellulases of this invention treated at 70° C for 10 minutes.

The optimum pH of each alkaline cellulase prepared from culture broths of $N_1$ strain and $N_4$ strain have been determined as crude enzyme (FIG. 3) and as treated at 70° C for 10 minutes (FIG. 5).

| | Microorganisms | |
|---|---|---|
| Optimum pH | $N_1$ strain | $N_4$ strain |
| crude enzyme | 8 – 9 | 6 |
| 70°C., 10 minutes treatment | — | 10.0 |

As illustrated in above table, it is noted that each crude alkaline cellulase of $N_1$ strain and $N_4$ strain is active within the pH range of about 7 to 10 and about 5 to 10, respectively. Further, it is found that the purified alkaline cellulase of strain $N_4$ shows the maximum activity at pH 10 and substantial activity in the region of about pH 9 to 11 as shown in FIG. 5.

3. Stable pH Range:

The alkaline cellulase obtained from each of culture broth of $N_1$ strain and $N_4$ strain was inactivated by treating at 60° C for 10 minutes and the residual activity was determined. The determined stable pH ranges of these cellulase are shown in the following table and in FIG. 6.

| | Microorganisms | |
|---|---|---|
| | $N_1$ strain | $N_4$ strain |
| pH Range | 6.5 – 11.0 | 5.5 – 11.0 |

Figure 6:
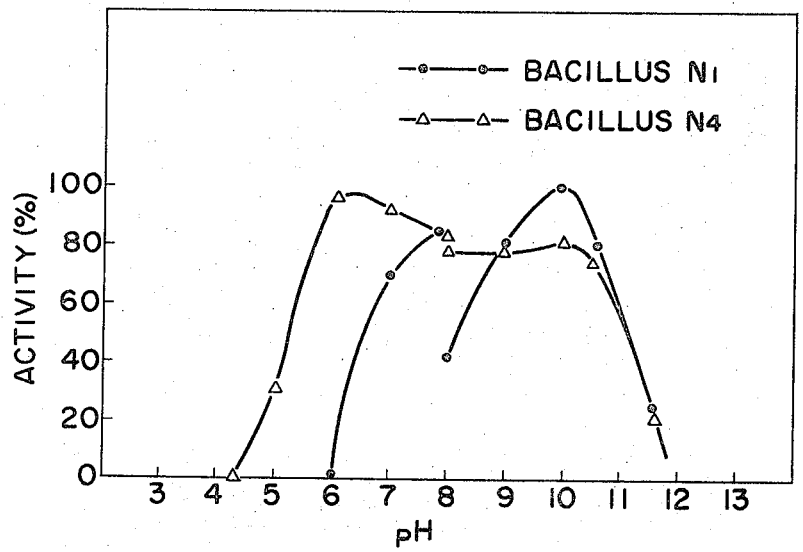
FIG. 6 is a graph illustrating the pH stability of the alkaline cellulase according to the present invention.

FIG. 6 shows the pH ranges in which the residual activity is more than 50 percent as calculated on the assumption that the maximum activity of the alkaline cellulase obtained from each of culture broths of $N_1$ strain and $N_4$ strain is 100 percent.

As illustrated in above table, the alkaline cellulase obtained from each of $N_1$ strain and $N_4$ strain is characterized by the breath of stable pH range.

Figure 7:
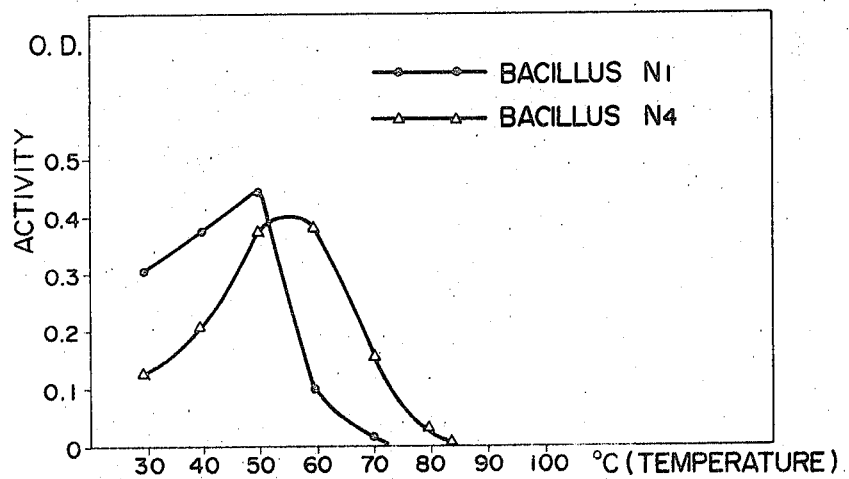
FIG. 7 is a graph illustrating the relation between the temperature and activity of the alkaline cellulases according to the present invention.

4. Conditions for Inactivation (Temperature Stability):

Conditions for inactivation were examined with respect to each alkaline cellulase obtained from culture broth of $N_1$ strain and $N_4$ strain at a pH of 9.0 by varying the temperature. Results of the tests are shown in FIG. 7, and the temperature at which the inactivation began is as follows:

| | Microorganisms | |
|---|---|---|
| | $N_1$ strain | $N_4$ strain |
| Temperature stability | 50°C. | 60°C. |

5. Prohibition, Activation and Stabilization:

With respect to each of alkaline cellulase produced by $N_1$ strain and $N_4$ strain, influences of metal ions and heating on prohibition or activation of these cellulase were determined and the results of these tests are shown below. The concentration of each metal ion is $10^{-2}$ M.

Figure 8:
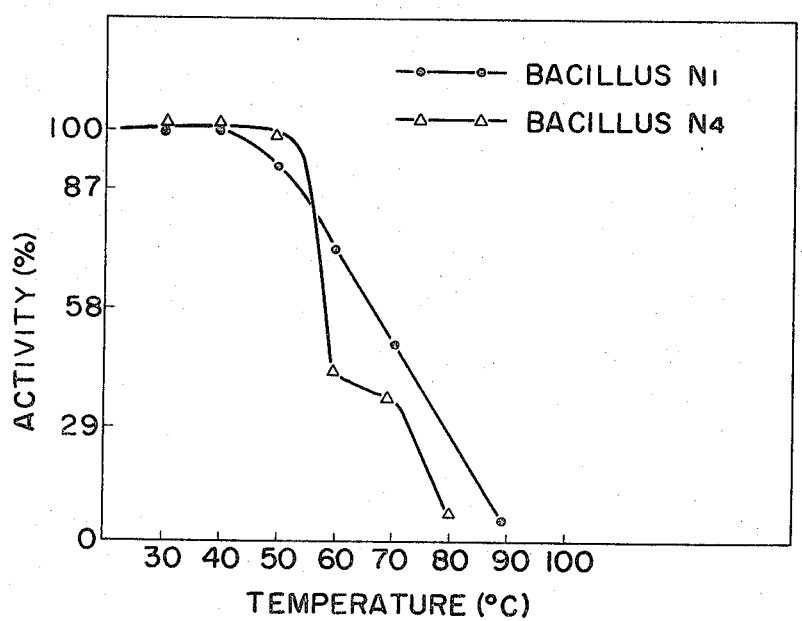
FIG. 8 is a graph illustrating the thermal stability of the alkaline cellulases of this invention.

FIG. 8 is a graph illustrating the thermal stability expressed by the residual activity after inactivation for 10 minutes at each temperature (measured at pH of 9.0). Namely, in the graph there is shown the range where the residual activity is more than 50 percent as calculated on the assumption that the maximum activity of each alkaline cellulase is 100 percent.

As shown in the following table, prohibition by ethylenediamine tetraacetate (EDTA) or p-chloromercuribenzoic acid (PCMB) to each of the alkaline cellulase was not observed at all.

| | Microorganisms | |
|---|---|---|
| | $N_1$ strain | $N_4$ strain |
| Prohibiting metal ions | $Cd^{++}$, $Hg^+$, $Pb^{++}$, $Cu^{++}$ | $Pb^{++}$ |
| Activating metal ions | $Ka^+$, $K^+$, $Ca^{++}$, $Mn^{++}$, $Fe^{++}$ | $Ca^{++}$, $Mn^{++}$ |
| Thermal stability | 70°C. | 70°C. |
| Prohibition by EDTA | not observed | not observed |
| Prohibition by PCMB | not observed | not observed |

6. Molecular Weight:

In accordance with the gel filtration method using "Sephadex G-100," molecular weights of alkaline cellulases produced by $N_1$ strain and $N_4$ strain are presumed to be as follows:

| Used Strain | $N_1$ strain | $N_4$ strain |
|---|---|---|
| Molecular weight | about $3 \times 10^4$ | about $3 \times 10^4$ and about $1.5 \times 10^4$ |

7. Process for Purification of Enzyme:

The purification will now be explained with respect to the enzyme produced by $N_4$ strain as an example.

The culture broth of $N_4$ strain is subjected to centrifugation to remove the bacterial cells and is adsorbed on DEAE-Sephadex (manufactured by Pharmacia, Sweden) equilibrated sufficiently the pH of the solution with 0.1 M $Na_2CO_3$ buffer solution (adjusted to pH of 9 by acetic acid). After sufficient washing the above buffer solution, the elution is effected with the above buffer solution incorporated with 0.5 M NaCl. Then, the eluate is subjected to the gel filtration with use of Sephadex G-100 (manufactured by Pharmacia, Sweden) sufficiently equilibrated with 0.1 M tris-HCl buffer solution (pH = 8).

The resulting product is a final standard substance.

8. Elementary Analysis:

Each of alkaline cellulases produced by $N_1$ strain and $N_4$ strain is presumed to have a molecular weight of about $3 \times 10^4$ from behaviors at the gel filtration using Sephadex G-100. Regarding enzymes having a high molecular weight, it is impossible to demonstrate characteristic properties even by conducting the elementary analysis and calculating analysis values of carbon, nitrogen, hydrogen and oxygen. For this reasons, the elementary analysis was not conducted on these alkaline cellulases.

Summing up, comparison of the physicochemical properties of the enzymes of the present invention, alkaline cellulases, with those of the known cellulase indicates clearly that these are novel alkaline cellulases which are different from any of the known cellulase.

Efficacy in Practical Use:

The enzymes of this invention, alkaline cellulases, are cellulose-decomposing enzymes and that have an optimal pH in the alkaline side, show enzymatic activity when used with sewage treatment.

The enzymatic activity of these alkaline cellulases will be explained below as the efficacy of the enzyme of this invention based on experimental results.

1. Usage:

When one of the enzymes of this invention is to be used as an additive for sewage treatment, the enzyme powder of this invention is directly added to sewage. There is no limitation in this preparation, such as the pH of sewage.

2. Efficacy (Enzymatic Activity in Detergents):

One of the enzymes of this invention was incubated for a definite length of time at 40° C in sewage, and decomposition of cellulose was measured.

Experimental Method:

The reaction was carried out using 1 gr of cellulose (Avicel SF) treated with alkali and 100 ml of the enzyme having 3,000 units per 100 ml with stirring at 37° C for 24 hrs.

In addition, the pH of the enzyme used was adjusted to 10.0 at the time of the reaction using a glycine-NaCl—NaOH buffer.

After completion of the reaction, insoluble celluloses were collected, and the dry weights of insoluble materials were measured.

Results:

Activity of the enzyme of this invention:

| Name of Micro-organisms | Dry weights of insoluble substrate (g) | Decomposition rate (%) |
|---|---|---|
| Bacillus $N_1$ | 0.83 | 17 |
| Bacillus $N_4$ | 0.72 | 28 |

This invention will now be detailed by reference to Examples.

EXAMPLE 1

A cultures medium (pH about 10) comprising 1.0 percent of peptone, 1.0 percent of meat extract, 1.0 percent of CMC, 0.5 percent of sodium chloride, 0.1 percent of $KH_2PO_4$ and 0.1 percent of anhydrous sodium carbonate (sterilized separately) was inoculated with Bacillus $N_1$ strain (ATCC 21832) and the shaking culture was conducted at 37° C. for 72 hours. The cells were removed by centrifugation to obtain a crude enzyme fluid. It was then dried with ethanol and pulverized by means of a conventional customary technique. An alkaline cellulase standard substance having a relative activity of 330 units/g was obtained in an amount of 16 g per liter of the culture broth.

EXAMPLE 2

A culture medium having the same composition as used in Example 1 was inoculated with Bacillus $N_4$ strain (ATCC 21833) and the shaking culture was conducted at 37° C for 72 hours. In the same manner as in Example 1, the ethanol-dried powder was obtained. An alkaline cellulase standard substance having a relative activity of 1,000 units/g was obtained in an amount of 10 g per liter of the culture broth.

What is claimed is:

1. An alkaline cellulase which is a member of the group of the alkaline cellulase from Bacillus $N_1$(ATCC 21832) and the alkaline cellulase from Bacillus $N_4$ (ATCC 21833) said alkaline cellulase having optimum stability in the pH range of 8 – 10 at a temperature of 40° C.

2. A process for preparing the novel alkaline cellulase having physicochemical properties defined in claim 1, comprising inoculating a strain of a microorganism selected from the group consisting of Bacillus $N_1$ (ATCC 21832) and Bacillus $N_4$ (ATCC 21833) in a culture medium composed of an alkali carbonate, a carbon source, a nitrogen source, and inorganic material, cultivating the said culture medium at pH 8 – 11, at temperatures of about 20° to 40° C for a period sufficient to impart substantial enzyme activity in the said culture medium and to produce the said alkaline cellulase in the said culture medium, and collecting the said alkaline cellulase from the said culture medium.

3. A process according to claim 2, wherein the culture is carried out under aerobic submerged condition with stirring.

4. A process according to claim 2, wherein the culture is carried out for about 24 to 75 hours.

5. The alkaline cellulase from the microorganism Bacillus $N_4$, according to claim 1, which when pure exhibits its maximum activity at pH 10.

6. The enzyme according to claim 1 which is not deactivated by ethylene diamine tetraacetate or by p-chloromercury benzoic acid.

* * * * *